Patented June 6, 1933

1,912,877

UNITED STATES PATENT OFFICE

JOHN C. WOODHOUSE, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

GAS PURIFICATION

No Drawing.   Application filed July 1, 1930.   Serial No. 465,239.

This invention relates to the removal of carbon dioxide at elevated temperatures from gaseous mixtures containing the same and more particularly from mixtures containing carbon dioxide and hydrogen.

Numerous methods have been proposed for the removal of carbon dioxide from gaseous mixtures such as contacting the mixtures with aqueous solutions of the caustic alkalies, scrubbing the carbon dioxide-containing gases with water at high pressures, or scrubbing the mixtures with solutions of ammonia. In these and similar processes, however, the separation has necessarily been accomplished at relatively low temperatures.

It is sometimes desirable, however, in removing carbon dioxide from gaseous mixtures, to effect the separation at an elevated temperature. Thus, for example, in the production of hydrogen by catalytic reaction of a gaseous mixture of steam and a carbon-containing compound such as carbon monoxide or a hydrocarbon, e. g. methane, it is known that a more efficient conversion of the carbon-containing material can be obtained if the gaseous products of the catalysis, including carbon dioxide, are subjected in a heated condition to carbon dioxide removal and then to further catalysis. That is, by removing the carbon dioxide from the reaction system and thereby displacing the established equilibrium a further conversion of the raw materials to hydrogen is made possible.

It is the object of this invention to provide an improved process for the removal of carbon dioxide at elevated temperatures from gaseous mixtures containing the same.

Other objects and advantages of the invention will be apparent as it is better understood by reference to the following specification wherein are described its details and preferred embodiments.

I have discovered that good results can be obtained in the removal of carbon dioxide from gaseous mixtures at elevated temperatures, say in excess of 100° C., by utilizing manganese oxide as an absorbent thereof. And, further, that especially satisfactory absorption can be obtained with this material using increased pressure, say pressures of from 5 to 10 atmospheres and above.

Manganese oxide suitable for the purpose of the present invention may be prepared in various ways including, for example, calcination of the mineral carbonate or the hydroxide and although the oxide so produced shows an eventual decrease in absorption rate when the temperature is sufficiently elevated, even at temperatures as high at 310° C. it will take up carbon dioxide at a very substantial rate. For example, I have prepared manganese oxide by calcination of mineral manganese carbonate (rhodochrosite) which attained at various temperatures and pressures (other conditions constant) the degrees of conversion to manganese carbonate noted below before losing its practical effectiveness as a carbon dioxide absorbent. The gaseous mixture used contained 20% by volume of carbon dioxide and 80% by volume of hydrogen.

| Temperature, °C. | Pressure (atm.) | % conversion MnO–MnCO$_3$ |
|---|---|---|
| 150 | 10 | 45 |
| 250 | 10 | 35 |
| 300 | 10 | 20 |

Other methods than the foregoing may be utilized for preparation of the oxide, however, and I have discovered that more satisfactory results may be obtained by employing in the process manganese oxide prepared by the calcination of an artificially precipitated manganese compound (carbonate, oxalate, etc.), which, upon calcination, gives manganese oxide. Thus, for example, I have prepared manganese oxide from the precipitated carbonate which attained, without substantial loss in efficiency, at various temperatures and pressures (other conditions constant) the degrees of conversion to manganese carbonate noted below. The gaseous mixture used contained 20% by volume of carbon dioxide and 80% by volume of hydrogen.

| Temperature, °C. | Pressure (atm.) | % conversion MnO-MnCO$_3$ |
|---|---|---|
| 150 | 10 | 90 |
| 250 | 10 | 70 |
| 300 | 28 | 73 |
| 310 | 10 | 60 |

The foregoing results indicate clearly that under similar conditions of pressure and temperature the manganese oxide prepared from an artificially precipitated carbonate possesses a greater capacity for absorption of carbon dioxide from gases than the oxide prepared from the mineral carbonate. Moreover, whereas the oxide prepared from the mineral sources will allow a leakage of 7-10% carbon dioxide in the exit gases when the degrees of conversion hereinbefore stated have been reached, under the same conditions of temperature and pressure the oxide prepared from the precipitated carbonate will allow a leakage of less than 0.1 to 0.2%.

A further feature of my invention is the discovery not only that the presence of steam in the gaseous mixture favors the removal of carbon dioxide therefrom but also that the proportions of steam present have a critical effect upon the results. Specifically my researches have demonstrated that the most satisfactory absorption is obtained when the volume ratio of steam to other constituents in the gaseous mixture being treated is approximately 0.5. As the steam concentration is raised above or lowered below this value a lower rate of absorption is observed, although the unfavorable effect is somewhat more marked with the lower ratios. The variation is not large, however, as long as the ratio mentioned is maintained within the range of substantially 0.2 to 5 and it is with steam concentrations of this order, therefore, that it is preferred to operate. It should, moreover, be noted that the unfavorable influence of the steam concentrations referred to applies not only to the specific preferred forms of manganese oxide which have been previously described but also to manganese oxides generally.

The following examples will serve to indicate the preferred procedure in carrying out the invention, it being understood that the invention is susceptible of wide variation in the manner of operation and is not limited to the specific details and methods of procedure herein described.

*Example 1.*—Crystals of a mineral rhodochrosite are separated, in the customary manner, from backing material or intermingled impurities. They are then crushed to 4-8 mesh size in a tableting machine, such as is employed for the preparation of pharmaceutical tablets. The product is charged into a reaction vessel, capable of withstanding pressure, of any suitable size and shape and the temperature is gradually raised to 525° C. while maintaining a pressure of one atmosphere. The decomposition of the carbonate is facilitated by passing a stream of a sweeping gas, such as hydrogen, through the apparatus during the heating. The major part of the carbon dioxide will come off rapidly at or somewhat below 450° C. and the temperature need be raised to 525° C. only in case it is desired to completely decompose the carbonate. Manganese oxide prepared in the foregoing manner has been employed in the purification of a gaseous mixture containing 80% by volume of hydrogen and 20% by volume of carbon dioxide, sufficient steam being added to correspond to a volume ratio of steam to hydrogen plus carbon dioxide of 0.5. Using a temperature of 300° C., a pressure of 10 atmospheres, and a carbon dioxide space velocity of from about ten to forty, the carbon dioxide was initially reduced to 1 per cent. and continued to be absorbed at a rapid rate until the manganese oxide had taken up 20% of its calculated capacity for carbon dioxide.

*Example 2.*—One hundred parts of manganese sulfate are stirred at room temperature into five hundred volumes of water containing forty-eight parts of sodium carbonate. This is then diluted with water, freed of oxygen and containing carbon dioxide, to a concentration of one part in two hundred. The resultant mixture is protected from the air and let stand until precipitation is largely complete (with occasional stirring). The precipitate is washed several times, until free of sulphate, and dried above one hundred degrees centigrade, being protected from oxidation by carbon dioxide. The dried material is crushed to 4-8 mesh in a tableting machine such as is employed for the preparation of pharmaceutical tablets. The product is then charged into a reaction vessel, capable of withstanding pressure, of any suitable shape and size, and is activated by heating to about 500° C. until the carbon dioxide is no longer evolved. The decomposition of the carbonate is facilitated by passing a stream of an inert gas, such as hydrogen, through the apparatus during the heating. The major part of the carbon dioxide will come off rapidly at or somewhat below 400° C. and the temperature need be raised to 500° C. only in case it is desired to completely decompose the carbonate. Manganese oxide prepared in the foregoing manner has been employed in the purification of a gaseous mixture containing 80% by volume of hydrogen and 20% by volume of carbon dioxide, sufficient steam being added to correspond to a volume ratio of steam to hydrogen plus carbon dioxide of 0.5. Using a temperature of 310° C., a pressure of 10 atmospheres, and a carbon dioxide space velocity of from about ten to forty, the carbon dioxide was initially reduced to 0.1 per cent. and continued to be absorbed at a rapid rate until the manganese oxide had taken up 60 per cent. of its calculated capacity for carbon dioxide.

It will be understood that the invention relates to removal of carbon dioxide from gaseous mixtures broadly, as, for example, mixtures containing carbon dioxide together with hydrogen, nitrogen, oxygen, or gaseous hydrocarbons, etc., and that, therefore, wide variations may be made in its application to the purification of gaseous mixtures and although reference herein is made more specifically to the use of manganese oxide in removing carbon dioxide from gaseous mixtures containing carbon dioxide and hydrogen, it can be used for carbon dioxide removal generally from gaseous mixtures containing the same.

Various changes may also be made in the methods described without departing from the invention or sacrificing any of the advantages thereof.

I claim:

1. The process of removing carbon dioxide from a gaseous mixture containing the same which comprises contacting said gaseous mixture at an elevated temperature within the range of 100–310° C. with manganese oxide.

2. The process of removing carbon dioxide from a gaseous mixture containing the same which comprises contacting said gaseous mixture, together with steam, at an elevated temperature below 310° C. with manganese oxide.

3. The process of removing carbon dioxide from a gaseous mixture containing carbon dioxide which comprises contacting said gaseous mixture, together with steam, in proportions corresponding to a volume ratio of steam to other gases within the range of from 0.2 to 5, at an elevated temperature below 310° C. with manganese oxide.

4. The process of removing carbon dioxide from a gaseous mixture containing the same which comprises contacting said gaseous mixture, together with steam, in proportions corresponding to a volume ratio of steam to other gases within the range of from 0.2 to 5, at an elevated temperature below 310° C. with manganese oxide prepared by calcination of artificially precipitated manganese carbonate.

5. The process of removing carbon dioxide from a gaseous mixture containing carbon dioxide and hydrogen, which comprises contacting said gaseous mixture at an elevated temperature below 310° C. with manganese oxide.

6. The process of removing carbon dioxide from a gaseous mixture containing the same which comprises contacting said gaseous mixture at an elevated temperature within the range of 100–310° C. and at a pressure in excess of five atmospheres with manganese oxide.

7. Process as in claim 1, employing manganese oxide prepared by calcination of an artificially precipitated manganese compound.

In testimony whereof, I affix my signature.

JOHN C. WOODHOUSE.